| United States Patent [19] | [11] | 4,227,511 |
|---|---|---|
| Margen et al. | [45] | Oct. 14, 1980 |

[54] SOLAR COLLECTOR APPARATUS

[75] Inventors: Peter H. E. Margen; Rutger A. Roseen; Heimo Zinko, all of Nyköping, Sweden

[73] Assignee: Aktiebolaget Atomenergi, Stockholm, Sweden

[21] Appl. No.: 900,799

[22] Filed: Apr. 27, 1978

[30] Foreign Application Priority Data

May 6, 1977 [SE] Sweden ............................. 7705325

[51] Int. Cl.³ ............................................. F24J 3/02
[52] U.S. Cl. ................................. 126/415; 126/424; 126/438; 126/440; 126/448
[58] Field of Search ............... 126/270, 271, 415, 416, 126/440, 449; 237/1 A; 350/292, 293, 299, 288

[56] References Cited

U.S. PATENT DOCUMENTS

| 1,673,429 | 6/1928 | Vinson | 126/271 |
| 3,620,206 | 11/1971 | Harris | 126/435 |
| 3,924,604 | 12/1975 | Anderson | 126/270 |
| 4,092,979 | 6/1978 | Kotlarz | 126/271 |
| 4,109,638 | 8/1978 | Matlock et al. | 126/271 |
| 4,114,596 | 9/1978 | Chang et al. | 126/271 |
| 4,148,301 | 4/1979 | Cluff | 126/271 |

OTHER PUBLICATIONS

Electricite Solaire (Solar Electricity), A Report on an International Conference in Toulouse, France on Mar. 1-5, 1976.
Thermochemical Water Cracking Using Solar Heat, An Article on the Proceedings of the Hydrogen Economy, Miami Energy (Theme) Conference in Miami in Mar. of 1974.
Turntable Solar Arrays, An Article on the Preceedings of Joint U.S./Canadian Solar Energy Conference in Winnipeg in Aug. of 1976.

Primary Examiner—James C. Yeung
Attorney, Agent, or Firm—Burns, Doane, Swecker & Mathis

[57] ABSTRACT

There is provided a solar collector apparatus comprising a rotatable platen supporting a solar collector, means for rotating the platen such that the solar collector follows the wandering of the sun, said solar collector comprising a plurality of elongated parallel sun radiation concentrators, each concentrator being associated with an elongated conduit which is arranged to be subjected to the radiation concentrated by the concentrator, and pump and control means for circulating a liquid through the conduits via a liquid magazine, the concentrators being located on the platen with their longitudinal axes aligned in the vertical plane of the solar direction, said means for rotating the platen being adapted to maintain such alignment of the concentrators.

15 Claims, 8 Drawing Figures

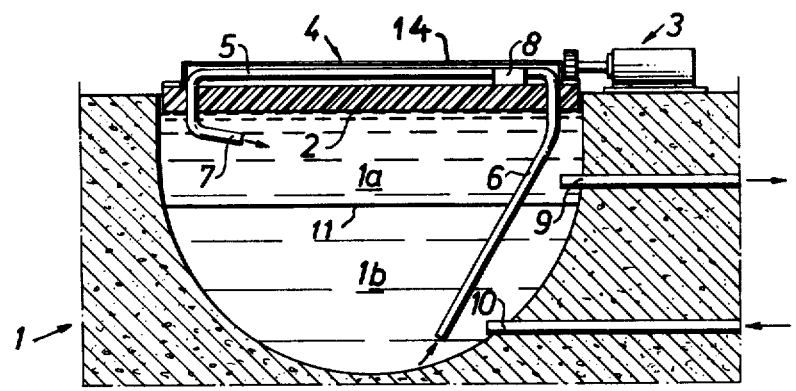
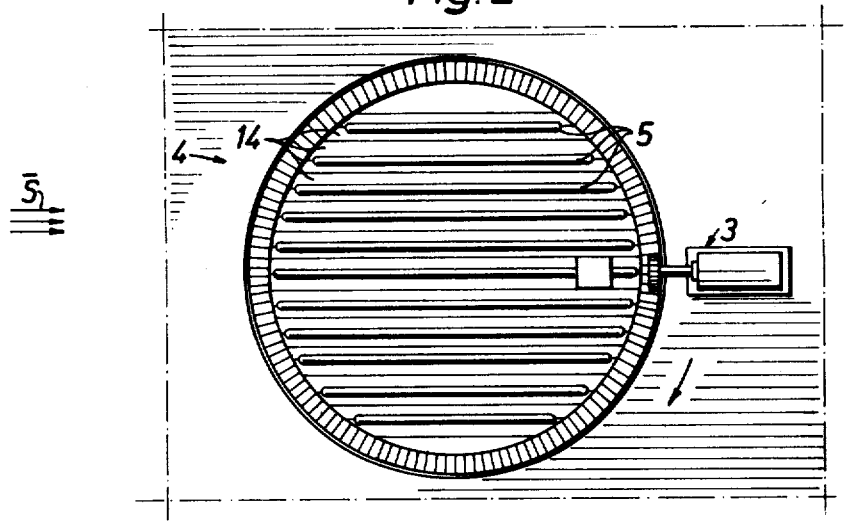

SOLAR COLLECTOR APPARATUS

The invention refers to a solar collector apparatus comprising a platen which is rotatable around a vertical axis, the solar collector supported by the platen, means for rotating the platen around said axis, such that the solar collector follows the wandering of the sun, said solar collector comprising a plurality of solar radiation concentrators, a heat absorber in the focus of each concentrator, and a pump and control means for circulating a liquid through the heat absorbers and a liquid magazine.

An apparatus of the aforesaid type is previously known from the publication SOLAR ELECTRICITY, INTERNATIONAL CONFERENCE Toulouse, France, March 1–5, 1976, p. 919 by K. Krebs. Cf. also German Offenlegungsschrift No. 24 41 770.

Especially if the platen supporting the solar collector is to be used as an insulating lid for a liquid magazine, the liquid of which is to be heated by the solar collector, there occure some problems.

One problem relates to the fact that such a magazine for heat insulation reasons should have the smallest possible wet-area relative to volume. This means that the water top surface of the magazine should be relatively small whereas the solar collector should be as large as possible in order to be able to heat the entire liquid volume during the warm season.

Therefore, the effective solar collector surface should be as large as possible during all the day. However, when the solar collector units consists of for example circular collector lenses, focused on heat absorbers, means must be provided to control the units such that they are kept aligned with the sun as the sun height varies during the day and during the seasons. Such control means are prohibitively expensive.

Moreover, the effective solar collector area is designed to be at a maximum for a certain sun height. However, as soon as the actual sun height deviates from the design value, the sun collector units tend to shade each other or leave inoperative spaces between themselves, thereby severely reducing the efficiency of the solar collector.

About the same problems would occur also if elongated reflector chutes oriented with their axes perpendicular to the sun direction were used for concentrators.

A primary object of the invention is therefore to improve an apparatus of the general type outlined above such that the above-mentioned draw-backs are reduced or eliminated.

Another object of the invention is to provide certain novel structural designs for elements of such an improved apparatus.

Thus, the invention relates to an apparatus of the type comprising a platen which is rotatable around a vertical axis, a solar collector supported by the platen, means for rotating the platen around said axis, such that the solar collector follows the wandering of the sun, said solar collector comprising a plurality of solar radiation concentrators, a heat absorber in the focus of each concentrator, and pump and control means for circulating liquid through the heat absorbers and a liquid magazine, and the inventive improvements are that the concentrators are elongated and arranged in parallel with each other, that the heat absorbers consist of conduits, located in the focal line areas of the concentrators, that the concentrators are located on the platen with their longitudinal axis aligned in the vertical plane of the solar direction, and that the means for rotating the platen is adapted to maintain such alignment of the concentrators.

Preferably the concentrators are constituted by elongated positive lenses, preferably so called Fresnel lenses. Such elongated Fresnel lenses can be manufactured by extrusion of a transparent plastics. The lenses can then be made fairly wide. If such lenses are located adjacent each other, they will form a covering over the platen, such that the volume between the lenses and the platen easily can be sealed. Thereby, the lenses will also define a stationary air-layer above the heat absorbers, and this air-layer will reduce heat loss from the absorbers due to convection.

Alternatively the concentrations can consist of reflector chutes having a substantially parabolic profile. The chutes may be formed of a folded sheet such that the chutes integrally adjoins each other. The folded sheet may comprise a central loop in each chute, and the loop may be closed by means of a welding seam for example to form said conduits. As it may be difficult to form the chutes with an exact profile, it is preferred to let the conduits be extended in the vertical direction such that their height dimension is larger than their width dimension. Thereby the sun radiation reflected from the chute surfaces will hit the conduit even if the focal lines of the chutes are diffuse. In order to enhance the energy absorption capability of the conduits, the conduits may be provided with a rough matted or black surface for example. Preferably the chutes are covered by glass or a glass clear plastic such that heat losses due to convection and re-radiation are reduced. Preferably the longitudinal axes of the concentrators are arranged with an angle to the horizontal plane in order to permit rainwater or snow to slide away from the concentrators or their covering. The top surface of the platen can then be arranged with an angle downwardly toward the sun and the concentrators be arranged in parallel with the top surface of the platen.

The platen is normally utilized as a lid on a liquid magazine. In such a case the lid should exhibit good heat insulation properties. This can be accomplished by making the platen of foam concrete or foam plastic for example. In such a case the platen will have a density which is less than that of the liquid in the magazine, such that the platen will float on the liquid whereby the water will form a bearing for the platen.

If the top surface of a platen consists of a cellular material such as foam plastic or cell plastic, it is conceivable to form reflector chutes in the platen by cutting recesses in the top surface of the platen having a profile corresponding to that of the reflecting chutes, and cover the recesses with a reflecting material. Alternatively it is conceivable to extrude foam plastic profiles having one or more such chute shaped recesses and join such profiles to the formation of the platen. The covering of a glass or glass clear plastic over the chutes may exhibit step shape such that the surface of the covering in maximum extent will lie in a plane perpendicular to the solar radiation direction.

The lid is preferably circular.

The invention is defined in the enclosed claims.

In the following some non-limiting examples on embodiments of the invention will be closer described with reference to the enclosed drawing.

FIG. 1 illustrates schematically a vertical section through an apparatus according to the invention.

FIG. 2 shows a schematic top view of the apparatus according to FIG. 1.

Figure 4:
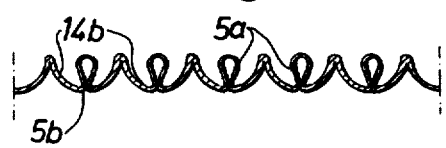
Figure 5:
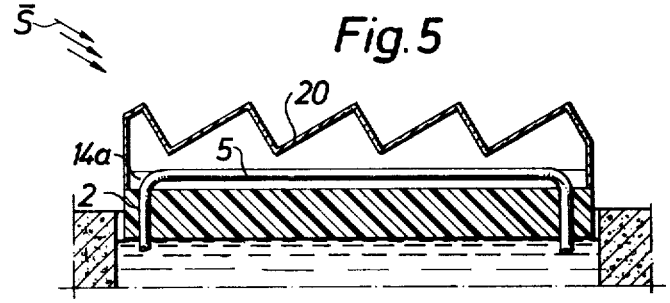
Figure 6:
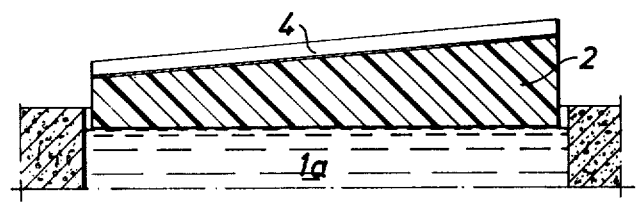
Figure 7:
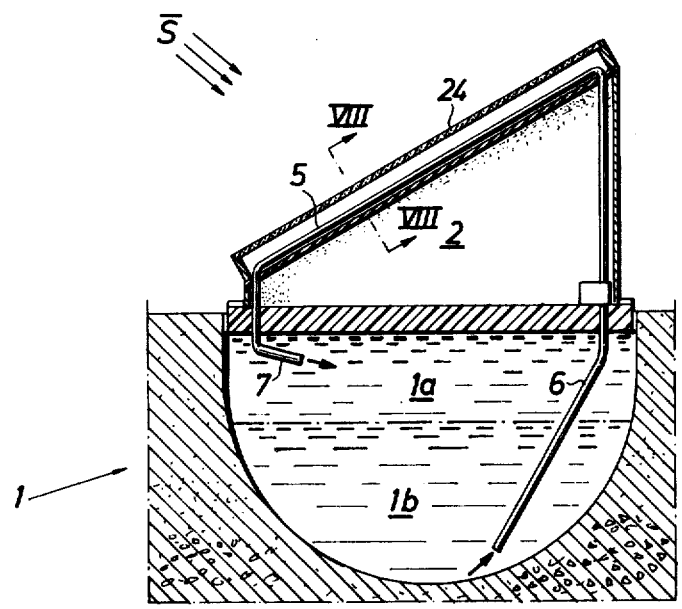
Figure 8:
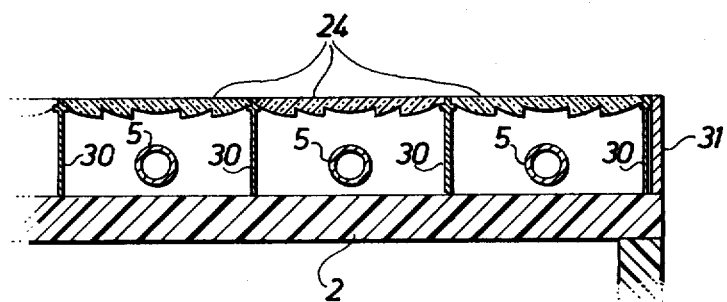

FIG. 4 shows a possible embodiment of solar collector for the inventive apparatus. FIG. 5 shows a detail of a possible embodiment of the invention. FIG. 6 shows a variant of an embodiment according to the invention. FIG. 7 shows a schematic vertical section through another embodiment of the inventive apparatus, and FIG. 8 illustrates a cross-section taken along the line VIII—VIII in FIG. 7.

In FIG. 1 item 1 generally depicts a water magazine having a circular surface. The circular insulation platen 2 floats on the water surface of the magazine. The platen 2 covers the entire top surface of the magazine and prevents heat losses from the magazine, partly by its heat insulating properties, partly by its evaporation reducing action. A drive means 3 is arranged to rotate the platen or lid 2 with a speed of 1 revolution/24 hours, such that the solar collector 4 which is mounted on the lid all the time is kept aligned with the sun. The solar collector 4 comprises a plurality of substantially horizontal reflector chutes 14 which are arranged adjacent each other and which have longitudinal axes that are aligned with a vertical plane through the solar directions, and the drive means 3 is arranged to see to it, that the chutes 14 all the time are kept aligned with the sun. The conduit 5 extends centrally to each chute 14, and this conduit 5 conducts water which is heated, partly directly by the sun radiation, partly indirectly by the radiation reflected by the walls of the chute 14. The conduit 5 is connected to an inlet pipe 6 which extends from the lower portion 1B of the magazine, and moreover the conduit 5 is at the other end thereof connected to an outlet pipe 7 which terminates in the upper portion 1A of the magazine 1. A pumping apparatus 8, controlled by a thermostat, can be arranged to uphold a suitable water-flow through the conduits 5 depending on the heating effect offered by the sun radiation.

The water magazine 1 can be considered as an accumulator of the stratified layer type wherein the upper hot layer 1A floats on the lower cold layer 1B. The stratification effect can be enhanced by arranging a plastic foil 11 in the border layer between cold and warm water, so that such plastic foil follows the vertical movements of the border layer and prevents mixing between hot and cold liquid. As is illustrated in FIG. 1, an outlet line 9 is connected to the hot layer, and an inlet line 10 is connected to the cold layer, the line 9 being utilized to feed hot water for heating purposes and for heating tap water in dwellings such as villas or the like, the cooled water being returned to the magazine via line 10.

A prominent feature of the invention is that the solar collector units, here the reflector chutes 14, are aligned with the sun directions. Hereby the solar collector will maintain a very high efficiency despite the variations of the sun height during the day and during the seasons.

Figure 3:
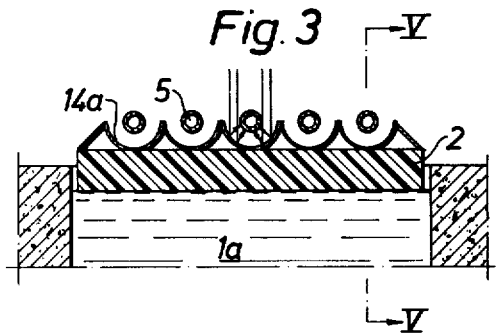
FIG. 3 shows a detail of the apparatus according to FIG. 1.

In FIG. 3 reflector chutes 14A are shown, having a substantially parabolic shape, the conduits 5 being arranged in the focal line of the chutes.

In FIG. 4 there is shown an alternative embodiment of the chutes, comprising a folded sheet. The sheet is folded in such a way that primarily chutes are formed having a generally semicircular cross-section, and in the middle of each such semi-circular fold, the sheet is moreover folded to the formation of a loop or bulb 5A which at its bottom is sealed by means of a welding 5b or the like, said closed loop forming a conduit for water to be heated. The loop 5A is elongated in the vertical plane, and this is of advantage as the shape of the chute 14B is likely to deviate from the exact intended form, such that the reflected radiation does not concentrate to a certain line but rather provides a diffuse focal line area. As moreover the sun radiation has a certain angle to the horizontal plane and to the longitudinal axis of the chutes, the reflected radiation tends to spread somewhat, therefore it may be desirable with conduits 5A being elongated in the vertical plane, even in the case with reflector chutes having a very accurate coverture.

In FIG. 5 there is shown a section which can be imagined to be taken along the line V—V in FIG. 3, wherein a covering 20 has been arranged over the chute 14. The covering 20 suitably consists of a glass or glass clear plastic, so as to primarily reduce heat losses due to convection and re-radiation. The covering 20 is designed in step shape in order to exhibit surfaces which lie in the normal plane to the incident solar radiation, whereby reflection losses are reduced. Alternatively the covering may also consist merely of a dome-shaped or flat covering plate over all the chutes.

In FIG. 6 there is shown an embodiment wherein the lid 2 has been designed with a wedge-shaped profile, such that the top surface of the lid 2 slopes downwardly toward the sun. Hereby rain-water and snow can easily flow away from the solar collector. Moreover, such a wedge shape offers the possibility of arranging the solar collector units closer to a normal plane through the solar direction, whereby i.a. reflection losses are reduced.

In FIG. 7 there is shown a magazine 1 on which a lid 2 floats. The lid 2 has a wedge shape in order to let the top surface thereof lie closer to the normal plane of the sun direction. The top surface of the lid forms an angle of about 25° to the horizontal plane. Along the top surface of the lid 2 there are conduits 5 to which pipes 6 and 7 are connected which terminate in the cold layer and the warm layer of the magazine 1. As is closer revealed in FIG. 8 lenses 24 are utilized to concentrate the incident sun radiation onto the conduits 5. The lenses are preferably in the shape of Fresnel lenses whereby the maximum thickness of the lenses is reduced. Preferably the Fresnel lenses 24 are made of a glass clear low weight plastic whereby the lenses can have a fairly large width. The lenses 24 are arranged edge to edge in a plane parallel to the top surface of the lid 2 and to the plane in which the conduits 5 lies. The lenses 24 are supported from the lid 2 by uprights or partitions 30. The lenses 24 form themselves a covering over the top surface of the lid 2. In order to seal the volume between the lenses 24 and the lid 2, panels 31 may be arranged to cover the edge area of said volume. Thereby the sealed volume or volumes between the lenses 24 and the lid 2 will act as an extra insulation which reduces re-radiation and convection losses. If desired the sealed volume may be filled with a suitable gas such as carbon dioxide to enhance the heat recovery. Preferably, each concentrator extends continuously across the entire length of the lid, whereby merely the extreme ends of the concentrators will be affected by the varying sun height, and the focal distance of the concentrators is preferably short so as to minimize the energy loss at the concentrator ends.

What is claimed is:

1. In a solar collector apparatus comprising a platen which is rotatable in a horizontal plane, a solar collector supported by the platen, means for rotating the platen in the horizontal plane such that the solar collector follows the sun, said solar collector comprising a plurality of a solar radiation concentrators, a heat absorber in the focus of each concentrator, and pump and control means for circulating a liquid through the heat absorbers and a liquid magazine, the improvements wherein:

the concentrators are elongated and arranged in parallel with each other, the heat absorbers include conduits located in the focal line areas of the concentrators, said conduits having an inlet tube connected to one end thereof, which inlet tube extends near the bottom of said magazine to draw liquid therefrom, and an outlet tube connected to the other end thereof which dispenses liquid near the top of said magazine to thereby establish a relatively warm layer of liquid which floats on a relatively cool layer of liquid in said magazine, the liquid magazine includes a separation foil arranged between the relatively cool and relatively warm layers in said magazine to inhibit intermixing thereof and thereby create a stratification effect in said magazine, the concentrators are located on the platen with their longitudinal axes aligned in the vertical plane of the solar direction, and the means for rotating the platen is adapted to maintain such alignment of the concentrators.

2. An apparatus according to claim 1 wherein the concentrators comprise lenses arranged side by side so as to cover the platen top surface.

3. An apparatus according to claim 2 wherein the lenses are Fresnel lenses.

4. An apparatus according to claim 3 wherein the Fresnel lenses consist of transparent extruded plastics material.

5. An apparatus according to claim 2 wherein panels extend between the top surface of the platen and the edges of the lenses whereby to close the volume between the lenses and the top surface of the platen.

6. An apparatus according to claim 1 wherein the concentrators comprise reflector chutes.

7. An apparatus according to claim 6 wherein the cross-section of the conduit is elongated in the vertical plane.

8. An apparatus according to claim 7 wherein the chutes and the conduits are formed integrally from a sheet folded to a series of chutes each having a central loop extending into the chute cavity, the bottom of the loop being sealed whereby the loop constitutes said conduit.

9. An apparatus according to claim 6 wherein the chutes are covered by a transparent covering.

10. An apparatus according to claim 6 wherein the chutes consist of elongated recesses in the surface of the platen, said recesses being coated with a reflecting material such as a metal coating.

11. An apparatus according to claim 1 wherein the concentrators are arranged with their longitudinal axis forming an angle with the horizontal plane, whereby the concentrators slope downwardly toward the sun.

12. An apparatus according to claim 11 wherein the angle is about 25°.

13. An apparatus according to claim 1 wherein the platen is arranged to float on the liquid of the magazine.

14. An apparatus according to claim 13 wherein the magazine is circular, and the platen covers the liquid top surface of the magazine.

15. An apparatus according to claim 13 wherein the platen comprises a heat insulating material such as foam concrete.

* * * * *